(12) United States Patent
Scholz et al.

(10) Patent No.: US 10,725,437 B2
(45) Date of Patent: Jul. 28, 2020

(54) SAFETY SENSOR FOR MONITORING THE OPERATIONAL SAFETY OF A SYSTEM

(71) Applicant: Bernstein AG, Porta Westfalica (DE)

(72) Inventors: Marcus Scholz, Loehne (DE); Georg Zwirkowski, Bueckeburg (DE); Thomas Krause, Porta Westfalica (DE)

(73) Assignee: BERNSTEIN AG, Porta Westfalica (DE)

( * ) Notice: Subject to any disclaimer, the term of this patent is extended or adjusted under 35 U.S.C. 154(b) by 148 days.

(21) Appl. No.: 15/767,824

(22) PCT Filed: Oct. 18, 2016

(86) PCT No.: PCT/EP2016/074960
§ 371 (c)(1),
(2) Date: Apr. 12, 2018

(87) PCT Pub. No.: WO2017/067918
PCT Pub. Date: Apr. 27, 2017

(65) Prior Publication Data
US 2018/0307187 A1 Oct. 25, 2018

(30) Foreign Application Priority Data
Oct. 23, 2015 (DE) .................. 10 2015 118 151

(51) Int. Cl.
*G05B 9/03* (2006.01)
*G05B 9/02* (2006.01)
(Continued)

(52) U.S. Cl.
CPC ............... *G05B 9/03* (2013.01); *G05B 9/02* (2013.01); *G05B 19/048* (2013.01); *G05B 19/0425* (2013.01); *G05B 2219/24054* (2013.01)

(58) Field of Classification Search
CPC .... G05B 9/03; G05B 19/0425; G05B 19/048; G05B 2219/24054; G05B 2219/24182
(Continued)

(56) References Cited

U.S. PATENT DOCUMENTS 8,902,936 B2 * 12/2014 Stephanson ............ G08C 15/02
370/537
9,477,212 B2 * 10/2016 Le ............................ G05B 9/02
(Continued)

FOREIGN PATENT DOCUMENTS

| DE | 199 27 635 A1 | 4/2001 |
| DE | 10 2004 020 997 A1 | 11/2005 |
| EP | 2 637 067 A2 | 11/2013 |

*Primary Examiner* — John A Tweel, Jr.
(74) *Attorney, Agent, or Firm* — W&C IP

(57) ABSTRACT

A safety sensor for monitoring the operational safety of a system comprises at least one safety signal input and at least one safety signal output. The safety sensor has a control unit. The control unit imprints the output safety signal with additional data, wherein the signal value of the output safety signal is changed within the limits of the value range assigned to the presently output signal state of the output safety signal depending on the additional data of the signal value of the output safety signal, and/or the control unit imprints the received input safety signal with additional data, wherein the signal value of the received input safety signal is changed within the limits of the value range assigned to the presently received signal state of the input safety signal depending on the additional data of the signal value of the received input safety signal.

16 Claims, 9 Drawing Sheets

Figure 1:
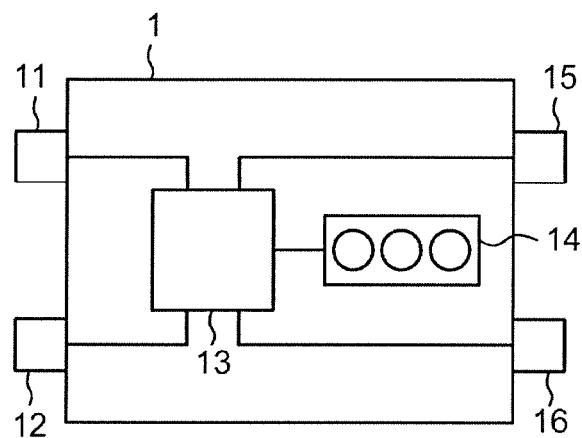

(51) Int. Cl.
*G05B 19/042* (2006.01)
*G05B 19/048* (2006.01)
(58) Field of Classification Search
USPC .......................................... 340/532
See application file for complete search history.

(56) References Cited

U.S. PATENT DOCUMENTS

| | | | |
|---|---|---|---|
| 2007/0091518 A1* | 4/2007 | Pullmann | H01H 47/002 |
| | | | 361/23 |
| 2011/0173497 A1 | 7/2011 | Nakatani et al. | |
| 2013/0233044 A1* | 9/2013 | Arth | G05B 9/03 |
| | | | 73/1.01 |

* cited by examiner

SAFETY SENSOR FOR MONITORING THE OPERATIONAL SAFETY OF A SYSTEM

The invention relates to a safety sensor for monitoring the operational safety of a system,
- a) with at least one safety signal input for receiving an input safety signal which can have a first signal state or a second signal state,
- b) with at least one safety signal output for transmitting an output safety signal which can have the first signal state or the second signal state,
- c) with a control unit which is connected to the at least one safety signal input and to the at least one safety signal output and which is configured to detect an operational state of the system which may be a safe or an unsafe operational state and to transmit an output safety signal whose signal state signals the detected operational state on the at least one safety signal output,
- d) wherein the first signal state signals a safe operational state of the system and is represented by a signal value from a first value range assigned to the first signal state, and the second signal state signals an unsafe operational state of the system and is represented by a signal value from a second value range which is assigned to the second signal state and which differs from the first value range.

Safety sensors or safety switches have become widespread in the field of safety technology for monitoring the operational safety of technical systems and for minimizing the hazards to persons inherent in such systems. It is thus known from the prior art, for example, that safety sensors are used to monitor and indicate the locking state of access doors, the interruption of light grids, the filling level of liquids and many other forms of the operational state of technical systems. All types of technical systems, for example a single production machine or an entire production line, but also e.g. an elevator system or other technical system, can essentially be considered as systems to be monitored.

A safety switch or safety sensor of this type is known, for example, from

In order to be able to achieve the aforementioned objects of a safety sensor, the safety sensor according to the invention has a control unit which is configured to detect the operational state of the system to be monitored and to distinguish at least between an unsafe and a safe operational state.

The safety sensor is configured to adopt an activated or a deactivated sensor state depending on the detected operational state of the system. An activated sensor state of the safety sensor is adopted if the safety sensor has detected a safe operational state of the system. A deactivated sensor state of the safety sensor is adopted if the safety sensor has detected an unsafe operational state of the system.

The operational state of the system can be detected by means of an external safety transmitter which is connected via a connection line to a safety signal input of the safety sensor. An external safety transmitter of this type may, for example, be a light barrier, a light grid, an actuator of a contactless safety switch which is fitted, for example, to an access door to be monitored, an emergency off switch or other safety transmitter which serves to detect the operational state of the system. However, the functionality of a safety transmitter of this type can also be integrated into the safety sensor, so that the safety sensor is able to detect the operational state of the system without an external safety transmitter. In addition, it is possible for the control unit of the safety sensor to detect the operational state of the system using an input safety signal transmitted by a different safety sensor and received at a safety signal input of the safety sensor.

On this basis, it is possible for the control unit to transmit an output safety signal whose signal state signals the detected operational state of the system—and therefore simultaneously the sensor state—on the at least one safety signal output of the safety sensor.

It is known from the prior art that a first signal state which signals a safe operational state of the system is represented by a signal value from a first value range, and the second signal state which signals an unsafe operational state of the system is represented by a signal value from a second value range which differs from the first value range.

In safety technology practice, it is desirable in many cases for safety sensors to provide additional data along with the simple signaling of a safe or unsafe operational state of the system.

For this purpose, two different approaches are known from the prior art. It is thus known, on the one hand, to install a dedicated diagnostic line from each sensor to an evaluation unit so that the sensor state of the safety sensor can be transmitted via the dedicated diagnostic line and can be uniquely assigned to the respective safety sensor. In addition, it is known to use safety sensors which have a bus interface in order to be connected to a data bus and to transmit additional data via this data bus to a control unit similarly connected to the data bus.

However, the aforementioned two solution approaches are associated with significant disadvantages. The use of dedicated diagnostic lines entails the disadvantage that an additional and complex wiring is necessary. Communication via a data bus entails the disadvantage that all devices connected to the data bus must be equipped with an additional bus interface, as a result of which substantial additional costs are incurred and a backward compatibility with conventional devices is excluded.

On this basis, the object of the present invention is to provide a facility, in the case of a safety sensor of the aforementioned type, for the transmission of additional data, in particular diagnostic and/or control data, without having to accept the aforementioned disadvantages of the solutions known from the prior art.

The object is achieved by a safety sensor for monitoring the operational safety of a system with the features of claim 1.

It is proposed that
- e) the control unit is configured to impress additional data on the transmitted output safety signal in that the signal value of the transmitted output safety signal is changed within the limits of the value range which is assigned to the presently transmitted signal state of the output safety signal depending on the additional data, and/or
- f) the control unit is configured to impress additional data on the received input safety signal in that the signal value of the received input safety signal is changed within the limits of the value range which is assigned to the presently received signal state of the input safety signal depending on the additional data.

Additional data within the meaning of the present invention may, in particular, be diagnostic and/or control data. In particular, it is desirable in many cases for the safety sensor to provide diagnostic data which simplify a diagnosis of the cause of the detection of an unsafe operational state of the system.

Diagnostic data of this type are of interest particularly if a plurality of safety sensors are cascaded by means of a series circuit and in this way form a safety sensor chain. To do this, the at least one safety signal output of a safety sensor can be connected in each case via a connection line to the at least one safety signal input of a different safety sensor and in this way the wiring of the safety sensors required for the installation can be simplified. This aspect of the invention will be described in more detail below.

The signal value of the safety sensor on which the additional data are impressed may essentially be the value of any physical quantity which is suitable for the representation of a signal. The signal value may, in particular, for example, be the value of an electrical voltage or an electrical current.

In this connection, it is advantageously possible to define a signal state by a lower threshold value and an upper threshold value, wherein the threshold values form the limits of the value range which is assigned to the signal state. In this way, a HIGH signal state which is represented by a first value range can be defined, for example, as the first signal state, and a second LOW signal state can be defined which is represented by a second value range, wherein the signal values of the first value range are invariably greater than the signal values of the second value range, i.e. the value ranges differ from one another.

It is then provided according to the invention that the control unit can impress additional data on the transmitted output safety signal in that the signal value of the transmitted output safety signal is changed within the limits of the value range which is assigned to the presently transmitted signal state. If, for example, an output safety signal is presently transmitted which has the second signal state because the control unit of the safety sensor has detected an unsafe operational state of the system, the signal value of the output safety signal is changed depending on the additional data without the upper threshold value of the value range assigned to the second signal state being exceeded or the lower threshold value of this value range being understepped. In the above-mentioned example of an electrical voltage, the value range of the second signal state may, for example, be a value range from −3 V to +2 V, so that the signal value is changed in this case within the value range between −3 V and +2 V in order to impress the additional data on the output safety signal.

In this way, additional data can be impressed on the transmitted output safety signal with no change in the operational state signaled by the output safety signal. A unit, e.g. a series-connected further safety sensor, an evaluation unit, an indicator unit and/or a switching device, connected to the safety signal output of the safety sensor thus detects the operational state of the system detected by the safety sensor using the output safety signal transmitted by the safety sensor, i.e., in the above-mentioned example, an unsafe operational state which is signaled by the second signal state. In addition, the unit connected to the safety signal output can extract the additional data which are impressed on the output safety signal transmitted by the safety sensor, e.g. diagnostic data and/or control data, from said signal.

Similarly, it is possible according to the invention for additional data to be impressed on a presently transmitted output safety signal of the first signal state which signals a safe operational state of the system in that the signal value of the output safety signal is changed within the limits of the value range assigned to the first signal state.

Alternatively or additionally, it is provided according to the invention that the control unit is configured to impress additional data on the received input safety signal. The data are applied in that the signal value of the received input safety signal is changed within the limits of the value range assigned to its present signal state.

If the safety sensor presently receives at its safety signal input, for example, an input safety signal having the second signal state which signals an unsafe operational state of the system, the control unit impresses the additional data on the received input safety signal in that the signal value of the input safety signal is changed within the limits of the value range assigned to the second signal state. The method used for impressing additional data on the received input safety signal otherwise corresponds to the method used for the output safety signal, so that the above descriptions for impressing additional data on the output safety signal apply accordingly.

The at least one safety signal input of the safety sensor is thus used simultaneously as the input for the received input safety signal and as the output for the transmission of additional data by impressing additional data on the received input safety signal at the safety signal input.

With the safety sensor according to the invention with the features of claim 1, a facility is advantageously created, beyond the simple signaling of the operational state of the system to be monitored, for transmitting additional data, e.g. diagnostic or control data, without having to provide a dedicated diagnostic line or a data bus interface on the safety sensor for this purpose.

According to the invention, the already available at least one safety signal output and the already available at least one safety signal input of the safety sensor can advantageously be used to transmit the additional data.

As a result, on the one hand, the implementation outlay for a safety sensor of this type and the associated costs can be considerably reduced since the safety sensor does not need to be equipped with an additional interface to transmit the additional data. In addition, the installation outlay associated with the installation of a safety sensor of this type and the resulting costs can be considerably reduced, since no dedicated connection lines are required to transmit the additional data, but the already available connection lines which are used to transmit the operational state of the system can be used.

It is also conceivable to make advantageous use of the functionality of a control unit already available in a conventional safety sensor in order to transmit the additional data. A low-cost implementation of a safety sensor according to the invention is thereby enabled.

The safety sensor according to the invention with the features of claim 1 furthermore offers the advantage that a compatibility with conventional safety sensors can be guaranteed. Conventional safety sensors of this type are configured to receive and/or to transmit safety signals which signal the detected operational state of a system to be monitored by means of a first and a second signal state of the safety signal, but they are not configured to transmit or to receive additional data which are impressed on the safety signal.

If a conventional safety sensor of this type transmits a safety signal to the safety signal input of a safety sensor according to the invention with the features of claim 1, the safety sensor according to the invention is thus able to detect the operational state of the system signaled by the conventional safety sensor on the basis of the signal state of the received safety signal. Conversely, a conventional safety sensor at whose safety signal input a safety sensor according to the invention with the features of claim 1 transmits a safety signal which contains additional data which are impressed on the safety signal is readily able to detect the operational state of the system detected by the safety sensor according to the invention on the basis of the signal state of the received safety signal.

Due to the compatibility guaranteed in this way between the safety sensor according to the invention and conventional safety sensors, further cost savings can be achieved in the installation of a monitoring system based on safety sensors.

The safety sensor according to the invention may advantageously have at least two safety signal outputs at which the same output safety signal is transmitted in redundant form. In this way, the reliability of the safety sensor is increased in the case where one of the safety signal outputs is not functioning correctly and does not therefore transmit the signal state of the output safety signal corresponding to the detected operational state of the system.

In a corresponding manner, the safety sensor according to the invention may have at least two safety signal inputs in order to receive the safety signal of a different safety sensor and/or an external safety transmitter transmitted in redundant form. In this case, the safety sensor may advantageously be configured already to detect an unsafe operational state of the system and consequently assume a deactivated sensor state if an input safety signal having the second signal state signaling an unsafe operational state of the system is received on at least one of the at least two safety signal inputs.

The safety signal transmitted by the safety sensor may furthermore contain test pulses for cross fault, short circuit, ground connection and/or ground fault detection. The signal state transmitted by the safety sensor at a safety signal output is changed for a very short time in order to be able to check whether both signal states are transmitted correctly at this safety signal output, i.e. whether a signal value within the respective assigned value range is set at the safety signal output. A cross fault, short circuit, ground connection and/or ground fault can be detected in this way.

The safety sensor according to the invention can be used not only as a single device but also in cascaded form as part of a safety sensor chain which comprises series-connected safety sensors.

According to one advantageous development of the invention, it is therefore provided that the at least one safety signal output is connectable to at least one safety signal input of a different safety sensor for the signal transmission and/or the at least one safety signal input is connectable to at least one safety signal output of a different safety sensor for the signal transmission in order to cascade a plurality of safety sensors by means of a series circuit to form a safety sensor chain.

As a result, the safety sensor according to the invention can advantageously be connected in series to other safety sensors according to the invention or conventional safety sensors, e.g. by connecting a safety signal output in each case to a safety signal input via a connection line in order to create a safety sensor chain consisting of cascaded safety sensors. Since a plurality of safety sensors are frequently used in safety technology practice to monitor the operational safety of a system, a series connection of this type offers the advantage that the complex evaluation and the necessary wiring of the safety sensors that are used are significantly simplified for the manufacturer and/or the operator of the system to be monitored.

In this connection, the control unit of the safety sensor may advantageously be configured to forward a safety signal having the second signal state by configuring the control unit to transmit an output safety signal having the second signal state on the at least one safety signal output of the safety sensor if an input safety signal having the second signal state is received on at least one safety signal input of the safety sensor.

Accordingly, each of the safety sensors which have been cascaded to form a safety sensor chain adopts a deactivated sensor state as soon as an input safety signal of the second signal state which signals an unsafe operational state of the system is received on at least one safety signal input, and therefore similarly transmits an output safety signal which signals an unsafe operational state of the system at its safety signal output. As a result, the information relating to an unsafe state of the system can be forwarded along the safety sensor chain.

By means of this method, a safety sensor chain is created which indicates a safe operational state of the system at the output of the last safety sensor in the safety sensor chain only if all series-connected safety sensors have an activated state, i.e. have detected a safe operational state of the system. Suitable measures can thereby be instigated to avoid a risk, e.g. a deactivation of the system, as soon as at least one of the series-connected safety sensors detects an unsafe state of the system. A commissioning of the system in such a case can advantageously be permitted only if all series-connected safety sensors have detected a safe operational state of the system. The reliability of the monitoring and the safety of the system are advantageously increased as a result.

If conventional safety sensors known from the prior art are used for a series connection of this type, the problem arises that, in the case of a deactivated sensor state of the last safety sensor in the safety sensor chain, the series-connected safety sensor that has triggered the deactivation of the sensor state, i.e. the safety sensor that originally detected the unsafe operational state of the system, is not identifiable from the safety signal which this last safety sensor in the safety sensor chain transmits. In particular, a plurality of series-connected safety sensors may also have detected an unsafe state of the system independently from one another, e.g. if a plurality of protective doors have been opened.

In such a case, a diagnosis of the cause of the unsafe state of the system requires a complex manual inspection of all parts of the system which could possibly be the cause of the detection of the unsafe operational state of the system. An added difficulty in many cases is that the parts of the system which come into consideration and/or the safety sensors connected to them can only be accessed with difficulty.

Conversely, with the safety sensor according to the invention, beyond the simple signaling of the operational state of the system to be monitored, additional data, e.g. diagnostic data, which enable a fast and simple diagnosis of the cause of the detection of an unsafe operational state of the system can advantageously be transmitted.

In a further advantageous development of the invention, it is provided that the control unit is configured to decode additional data impressed on the input safety signal from the input safety signal and/or to decode additional data impressed on the output safety signal from the output safety signal.

The control unit is thus configured to decode externally impressed additional data from the safety signal. Externally impressed additional data are additional data, e.g. diagnostic data and/or control data, which a safety sensor other than the decoding safety sensor or a different device has impressed on the safety signal.

As a result, the safety sensor is enabled to receive externally impressed additional data which are impressed on the safety signal transmitted to the safety signal input of the safety sensor. These received additional data can be evaluated, indicated and/or forwarded by the receiving safety sensor.

The safety sensor is furthermore enabled to receive externally impressed additional data, e.g. diagnostic data and/or control data, which are impressed on the safety signal present at the safety signal output of this safety sensor. In this way, the safety signal output of the safety sensor according to the invention can be used as both the output for transmitting an output safety signal and as the input for receiving additional data. The received additional data which have been decoded from the output safety signal can be evaluated, indicated and/or forwarded by the safety sensor.

In this way, a two-way communication is enabled between the safety sensors in a safety chain and/or other devices connected thereto. Diagnostic data, for example, can thus be made available from the safety sensors via the safety sensor chain or control data can be transmitted to the safety sensors via the safety sensor chain.

In a further advantageous development of the safety sensor according to the invention, it is provided that the additional data comprise diagnostic data which relate to an identifier of the safety sensor, a position of the safety sensor, the operational state of the system detected by the safety sensor, the type and/or cause of a detected unsafe operational state and/or other diagnostic information.

It is thus proposed that additional data which comprise diagnostic data are impressed on the transmitted output safety signal and/or on the received input safety signal. This offers the advantage that diagnostic data which, for example, simplify and speed up the diagnosis of the cause of the detection of an unsafe operational state of the system can be transmitted from one safety sensor to another safety sensor and/or to another device connected to the safety sensor. It is thus possible, for example, for a safety sensor according to the invention to transmit diagnostic data via the safety sensor chain or directly to an evaluation unit connected to the safety sensor.

These diagnostic data may contain, for example, an identifier of the safety sensor in conjunction with information relating to the operational state of the system detected by the safety sensor. It is thus possible for an evaluation unit connected directly or indirectly to the safety sensor to detect which of the safety sensors connected to the evaluation unit originally detected an unsafe operational state of the system on the basis of the additional data impressed on the safety signal. The diagnosis of the cause of the unsafe operational state of the system is thereby significantly simplified and sped up.

The diagnostic data may furthermore also contain information relating to the position of the safety sensor. Such a position of the safety sensor may, for example, be a geographical position of the safety sensor, a relative position of the safety sensor within the safety sensor chain and/or other position information. If such position information in conjunction with the operational state of the system detected by the safety sensor is made available by the safety sensor, the diagnosis of the cause of a detected unsafe state of the system can be significantly simplified and sped up.

The diagnostic data may furthermore contain information relating to the type and/or cause of a detected unsafe operational state. It is conceivable, for example, for a safety sensor which is connected to a plurality of external safety transmitters to signal in this way which of the safety transmitters is responsible for the detection of an unsafe operational state of the system, or, for example, the position of a light grid interruption within a light grid can be signaled.

In a further advantageous development of the invention, it is provided that the additional data comprise control data which are used for the parameterization and/or the remote control of a safety sensor, an actuator, an evaluation unit and/or other device connected to the safety sensor.

It is thus advantageously possible to remotely parameterize or remotely control the safety sensor or other device connected directly or indirectly to it, such as, for example, an actuator or an evaluation unit. Control data, for example, can thus be transmitted from an evaluation unit connected to the safety sensor chain to a safety sensor in order to parameterize the safety sensor. A parameterization of this type may relate, for example, to the identifier of the safety sensor, its position within the safety sensor chain, the type of additional data to be made available by it and/or other parameters. An actuator or the evaluation unit can be parameterized and/or remotely controlled in a similar manner by means of the control data. For example, an actuator can be remotely controlled using the control data in order to effect a deactivation of the system, a transfer of the system to a safe state and/or a reactivation of the system. An evaluation unit can be parameterized and/or remotely controlled using the control data, for example, with regard to the data which are to be evaluated and/or indicated by it.

The impression of additional data in the form of control data thus offers the advantage that the safety sensors and/or other devices connected to them can be remotely parameterized and/or controlled in a simple manner, as a result of which the safety engineering configuration is substantially simplified.

In a further advantageous development of the invention, it is provided that the control unit is configured to forward additional data in that the control unit impresses additional data impressed on the received input safety signal in unchanged form or changed form on the output safety signal and/or impresses additional data impressed on the output safety signal present at the safety signal output in unchanged or changed form on the input safety signal.

It is thus advantageously possible to forward the additional data along the safety sensor chain from one safety sensor to another safety sensor. Diagnostic data, for example, which a first safety sensor in a safety sensor chain has generated can be forwarded via the safety sensor chain to an evaluation unit connected to the last safety sensor in the safety sensor chain so that an evaluation of the diagnostic data and a diagnosis based thereon are possible using the evaluation unit. In addition, control data, for example, can be forwarded from the evaluation unit connected to the safety sensor chain via the safety sensor chain to one or more safety sensors and/or other devices connected to the safety sensor chain in order to perform a parameterization and/or remote control of the safety sensors or other devices.

The forwarding of the additional data can thus be two-way, i.e. both in the direction from the safety signal output to the safety signal input and in the direction from the safety signal input to the safety signal output.

The additional data can furthermore be forwarded in unchanged or changed form. One safety sensor can thus, for example, forward the diagnostic data generated by another safety sensor in unchanged form in order to make said diagnostic data available to an evaluation unit connected to the safety sensor chain. However, the safety sensor can also forward the additional data received from another safety sensor in changed form, for example by adding the receiving safety sensor's own diagnostic data to the received diagnostic data.

By forwarding the received additional data in changed form, it is additionally possible, for example, for position information to be added to the additional data as diagnostic data without the safety sensor which originally generated the additional data and impressed them on the safety signal having to know its position. To do this, a forwarding counter can be used whose counter reading is incremented by each safety sensor in the safety sensor chain and is impressed on the safety signal as additional data. As a result, it is possible for a control unit connected to the safety sensor chain to extract the counter reading from the received additional data and determine from it the position of the safety sensor which originally generated additional data, e.g. diagnostic data.

In a further advantageous development of the safety sensor according to the invention, it is provided that the control unit is configured to generate diagnostic data depending on the received input safety signal and/or depending on the operational state of the system detected by the control unit and to impress said diagnostic data on the output safety signal as additional data.

It is thus proposed that the control unit of the safety sensor can generate diagnostic data depending on the operational state of the system detected by the control unit. As already explained above, the detection of the operational state of the system required for this purpose can be carried out using an external safety transmitter. Similarly, the functionality of a safety transmitter of this type may also be integrated into the safety sensor, so that the safety sensor itself is able to monitor and detect the operational state of the system without using an external safety transmitter.

It is thus possible, for example, for the safety sensor to detect the opening of a protective door and therefore an unsafe operational state of the system. In this case, it is possible, for example, for the control unit to generate diagnostic data following the detected unsafe operational state of the system, to impress said diagnostic data on the output safety signal as additional data and in this way enable an evaluation unit connected directly or indirectly to the safety signal output of the safety sensor to identify the cause of the unsafe operational state, i.e. the open door detected by the safety sensor.

It is furthermore proposed that the diagnostic data can be generated depending on the received input safety signal and can be impressed on the output safety signal. In this way, it is advantageously possible, in particular, for a safety sensor according to the invention which receives an input safety signal at its safety signal input which was generated by a conventional safety sensor and consequently contains no additional data to generate diagnostic data itself which are usable for a diagnosis and to impress said diagnostic data on the output safety signal as additional data. In this example, the safety sensor can generate position information, in particular, as diagnostic data indicating that the safety sensor in the safety sensor chain responsible for the deactivation of the sensor states in the sensor chain is located on the side of the safety signal input of the safety sensor generating the diagnostic data. In this way, a compatibility with conventional safety sensors is achieved in that the safety sensor according to the invention can be deployed, utilizing its full functionality, together with one or more conventional sensors within a safety sensor chain.

In a further advantageous development of the safety sensor according to the invention, it is provided that the control unit is configured to impress additional data on the transmitted output safety signal only if the output safety signal has the second signal state and/or to impress additional data on the received input safety signal only if the input safety signal has the second signal state.

It is thus proposed that additional data are impressed on the safety signal only if the safety signal signals an unsafe operational state of the system. This is advantageous, on the one hand, because additional data, in particular diagnostic data, which are made available by the safety sensor are particularly valuable for diagnostic purposes if an unsafe state of the system has been detected or one or more safety sensors in the safety sensor chain have consequently adopted a deactivated sensor state, since the cause of the detection of an unsafe operational state can be diagnosed in this way.

In addition, it is particularly advantageous to impress additional data on the safety signal only if the safety signal has the second signal state and thus signals an unsafe operational state, since it is known and widespread from the prior art that the second signal state indicating an unsafe operational state of the system is represented by a LOW logical signal state, the assigned value range of which contains the reference value for the physical quantity used as the signal value. If, for example, an electrical voltage is used as a signal value, a reference potential of 0 V normally serves as the reference quantity for the voltage value, so that the second signal state of the safety signal can be represented by the safety signal output being de-energized.

In a further advantageous development of the invention, it is provided that the safety sensor has an indicator unit which is configured for the visual and/or audible indication of the operational state of the system and/or the additional data.

An indicator unit of this type may be implemented, for example, by LEDs, e.g. similar to a traffic light in red, amber and green colors, or by means of a different visual indication form. However, an indication of this type may, for example, also be implemented audibly, e.g. by sounding a warning tone. However, a tactile indication, for example, or a combination of the aforementioned indication types is also conceivable and advantageous.

In this way, the operational state of the system and/or the additional data can advantageously be indicated directly on the safety sensor. It is thus possible, for example, to indicate whether the safety sensor has detected a safe or an unsafe operational state of the system. Control data, for example, or diagnostic data can be indicated as additional data, so that it is advantageously possible, inter alia, to infer directly from the indicator unit of the safety sensor which of the safety sensors in a safety sensor chain has detected an unsafe operational state of the situation. The cause of the detection of an unsafe operational state of the system can thereby be diagnosed without the need for a separate evaluation unit or indicator unit for this purpose.

In a further advantageous development of the safety sensor according to the invention, it is provided that the at least one safety signal output is connectable for the signal transmission to a switching device of the system which is configured to deactivate the system and/or transfer the system to a secured state and/or instigate measures to avert risks arising from an unsafe operational state of the system.

According to the invention, a switching device of this type may, in particular, be a contactor, a relay, an actuator and/or other switching device.

It is thus advantageously possible to connect the safety sensor or a safety sensor chain consisting of safety sensors directly to a switching device and to instigate measures to avert risks using the switching device if an unsafe operational state of the system has been detected by the safety sensor or by one of the safety sensors in the safety sensor chain. To do this, the system can be deactivated and/or transferred to a secured state, so that, for example, a risk from rotating or otherwise moving parts is prevented.

In a further advantageous development of the invention, it is provided that the at least one safety signal output is connectable for the signal transmission to an evaluation unit which is configured to evaluate received safety signals and/or received additional data and/or is configured for the visual and/or audible indication of the operational state of the system and/or the additional data.

According to the invention, the functionality of an evaluation unit of this type may also be integrated into a safety sensor.

An evaluation unit of this type may advantageously, in particular, be connected to the at least one safety signal output of the last safety sensor in a safety sensor chain. As a result, the evaluation unit can be used to evaluate the safety signals and/or the additional data which are transmitted by the safety sensors connected to the evaluation unit. On the basis of an evaluation of the received safety signals, measures can be instigated, for example, which serve to avert risks arising from an unsafe operational state of the system. On the basis of an evaluation of the additional data, if said data comprise, for example, diagnostic data generated by the safety sensors, the evaluation unit can carry out a diagnosis of the cause of the detection of an unsafe operational state of the system. According to the invention, it is furthermore possible to indicate the operational state of the system and/or the additional data using the evaluation unit in order to make this information available to operating, maintenance and/or repair personnel.

According to a further advantageous development of the safety sensor according to the invention, it is provided that the signal value is an electrical voltage value related to a reference potential.

It is advantageous if either the first or the second value range comprises the reference potential, in particular a reference potential of 0 V.

If either the first or the second value range comprises the reference potential, it is advantageous and easily possible to transmit a safety signal of the signal state which is assigned to this value range by de-energizing the safety signal output. It is furthermore advantageous if the second value range to which the second signal state which signals an unsafe operational state of the system is assigned comprises the reference potential. In this case, a failure of the safety sensor or its control unit, e.g. due to a failure of the supply voltage, has the result that the voltage transmitted as a signal value at the safety signal output drops to the reference potential and an unsafe operational state of the system is therefore automatically signaled. The reliability of the operational safety monitoring can be advantageously increased as a result.

According to a further advantageous development of the invention, it is provided that the signal value in the form of an electrical voltage is changed within a value range from +11 V to +30 V for the first signal state and within a value range from −3 V to +2 V for the second signal state.

The aforementioned voltage values correspond to the values specified in relevant safety engineering standards for signaling an unsafe or safe operational state of a system (cf. e.g. the DIN EN 61496-1 (VDE 0113-201): 2014-05 standard). The use of the aforementioned value ranges therefore offers the advantage that a safety sensor or other device which complies with current safety engineering standards can reliably detect the operational state of the system signaled by the respective signal state on the basis of a safety signal transmitted by a safety sensor according to the invention, independently from the additional data impressed on the safety signal. The standard compliance of the safety sensor according to the invention and its compatibility with conventional standard-compliant safety sensors and other devices are advantageously guaranteed as a result.

According to a further advantageous development of the invention, it is provided that the control unit is configured to impress additional data on the transmitted output safety signal and/or on the received input safety signal using a unipolar or bipolar line code, an AMI code, a block code, a Manchester code, an amplitude shift keying, a frequency shift keying, a phase shift keying, a quadrature amplitude modulation, a pulse amplitude modulation, a pulse phase modulation, a pulse frequency modulation and/or a pulse width modulation.

The additional data to be impressed on the safety signal may be present in analog or digital form. The additional data may be transmitted through baseband transmission as a baseband signal or as a useful signal which is modulated onto a carrier signal.

The use of a unipolar or bipolar line code, an AMI code (Alternate Mark Inversion Code), a block code or a Manchester code offers the advantage that the additional data impressed on the safety signal can be transmitted as a baseband signal and a particularly simple and economical implementation of the necessary transmission technology is possible in this way. The use of an amplitude shift keying or amplitude modulation offers the advantage that the impressed additional data can be demodulated with very simple circuits. The use of a frequency shift keying or frequency modulation offers the advantage that modulation and demodulation are simple to implement and the transmission is particularly resilient to interference. The use of a phase shift keying or phase modulation offers the advantage of a high resilience to interference and a low bandwidth requirement. The use of a quadrature amplitude modulation offers the advantage that a higher number of data bits can be transmitted per symbol and time unit, so that higher data rates can be achieved with a comparatively low bandwidth requirement. The use of a pulse amplitude modulation, pulse phase modulation, pulse frequency modulation and/or pulse width modulation offers the advantage of a simple and economical implementation of the transmission technology.

Figure 2:
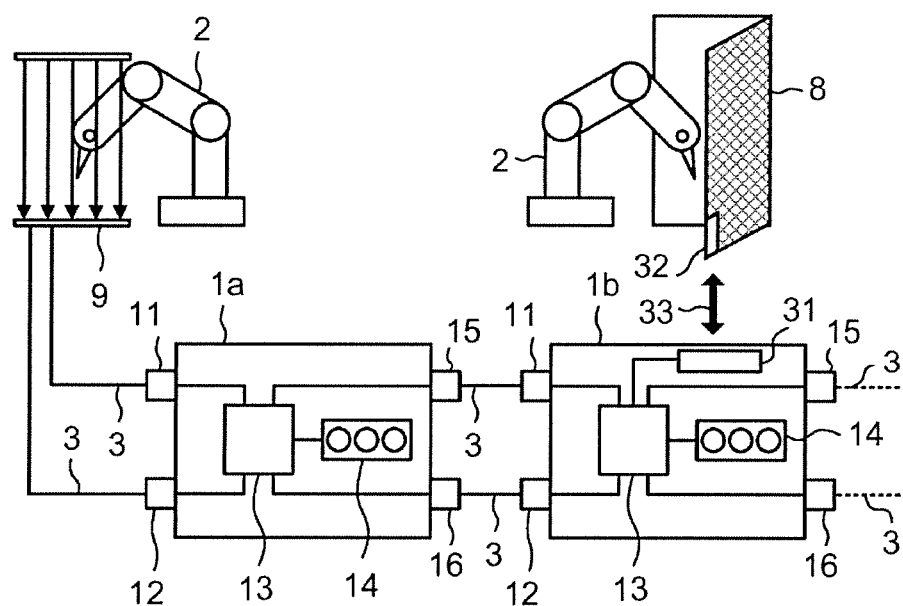
Figure 3:
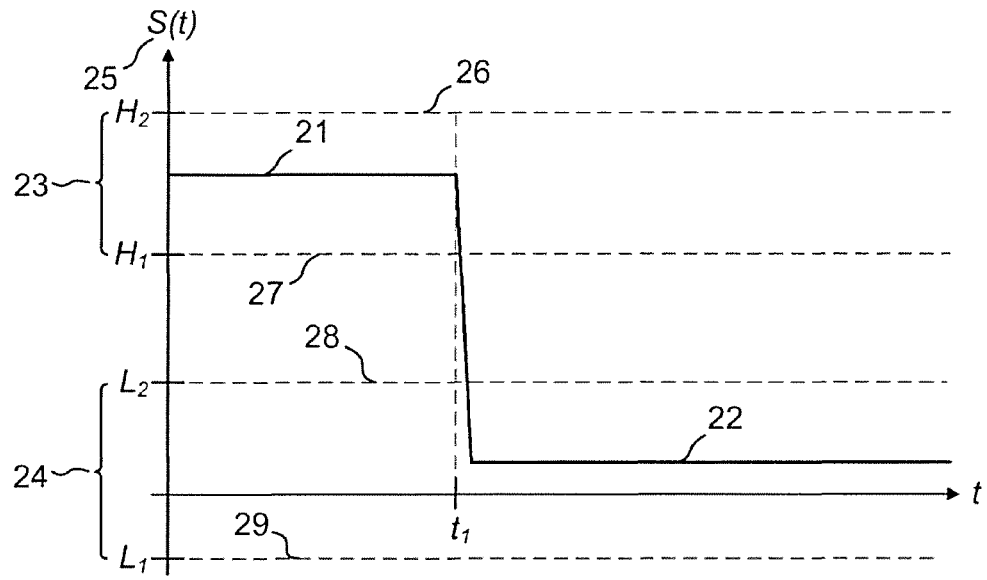
Figure 4:
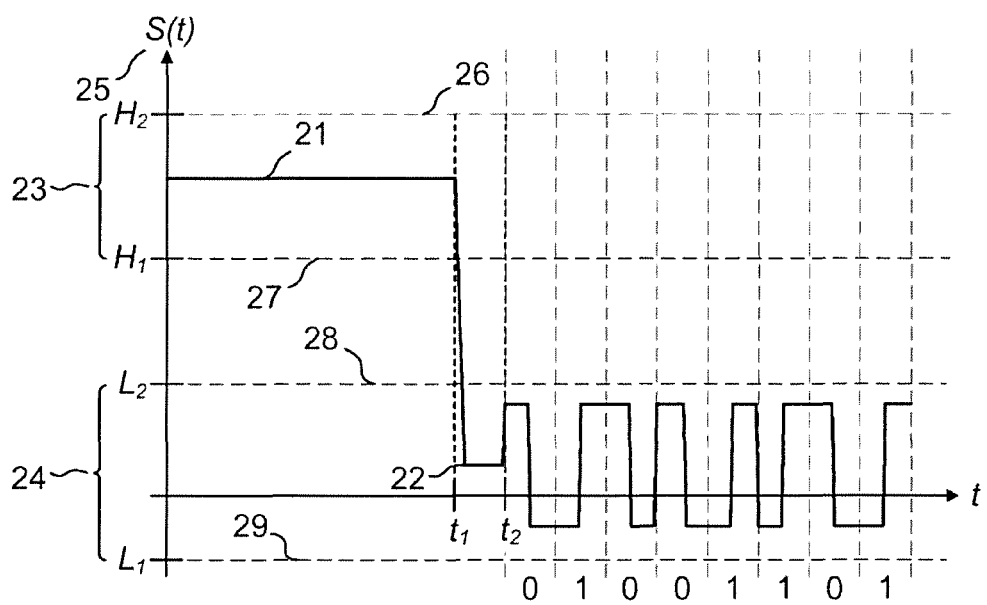
Figure 5:
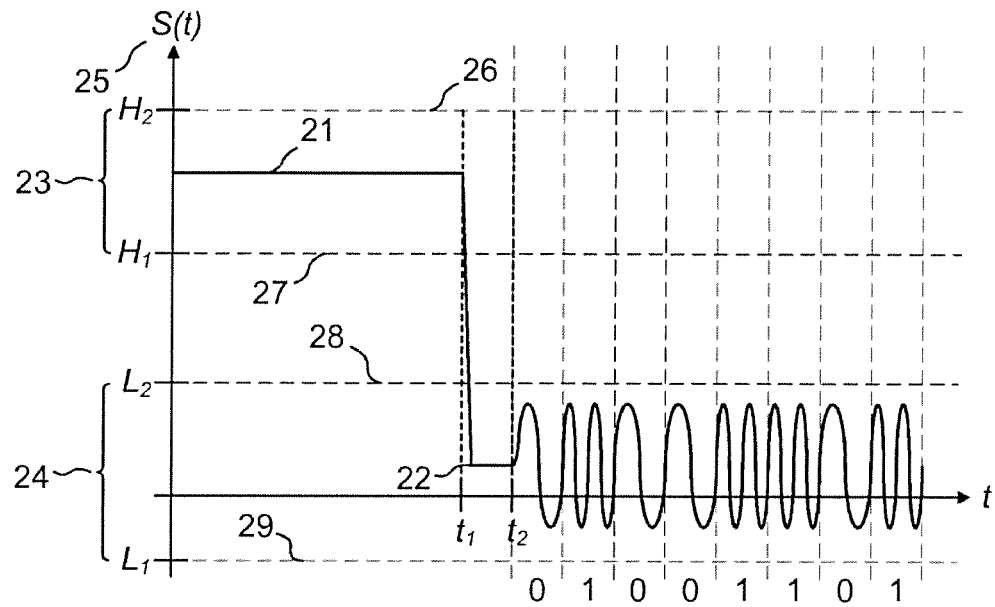
Figure 6:
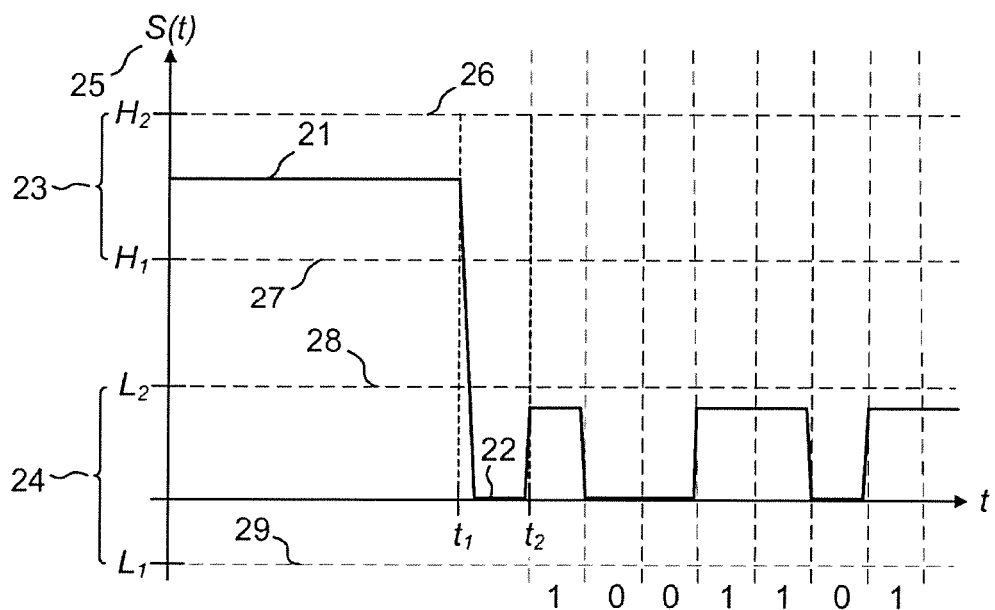
Figure 7:
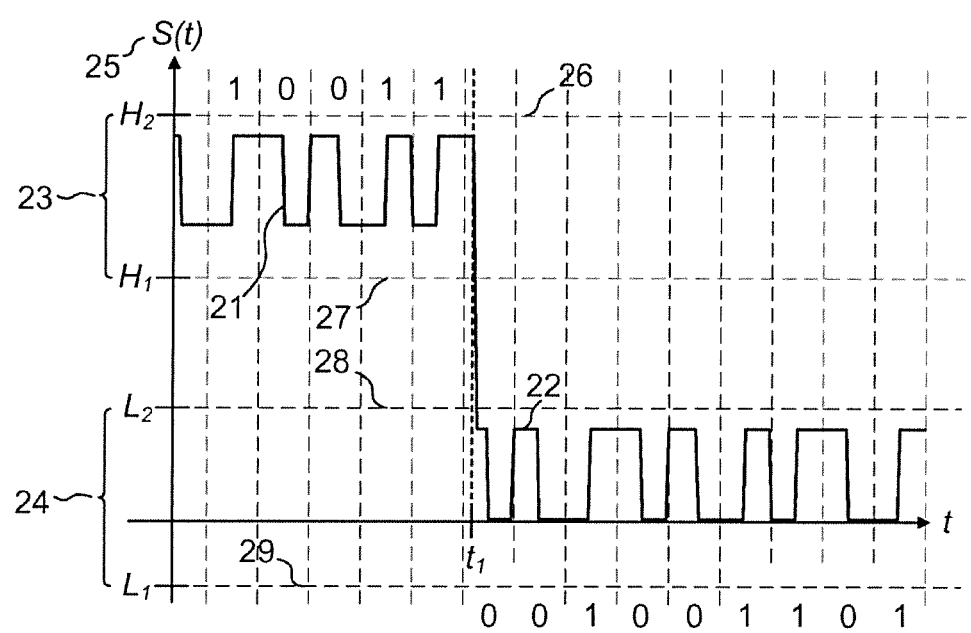
Figure 8:
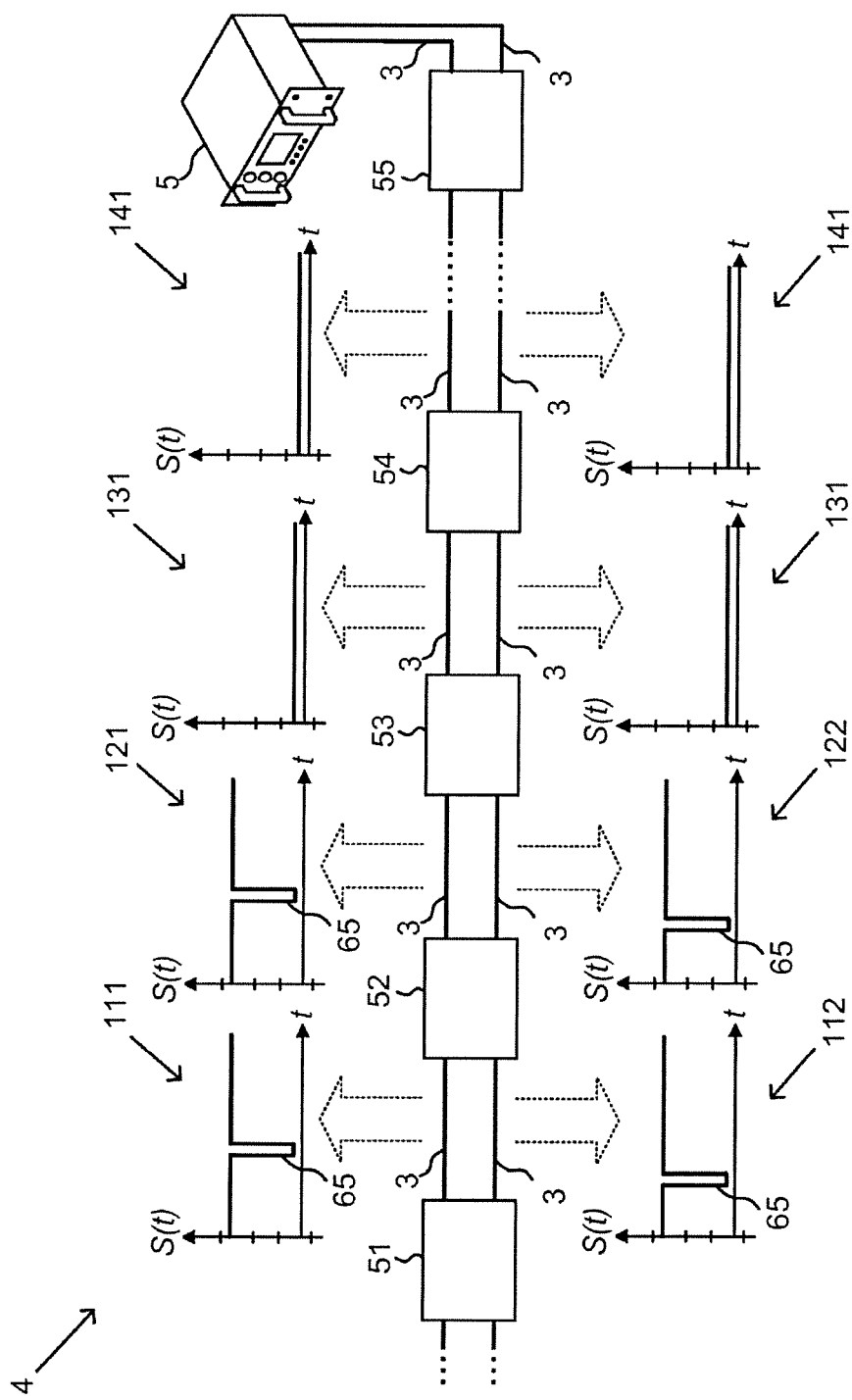
Figure 9:
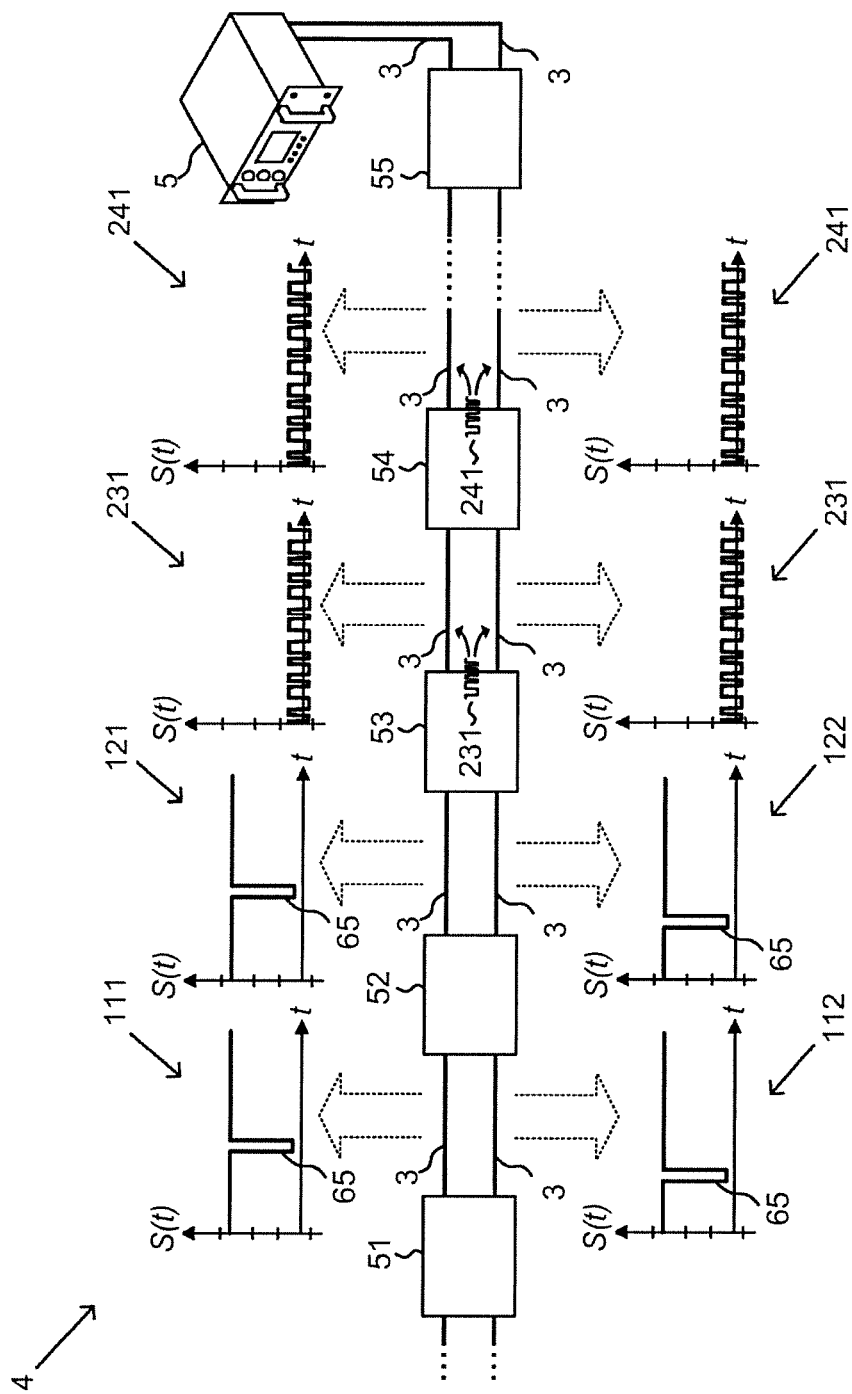
Figure 10:
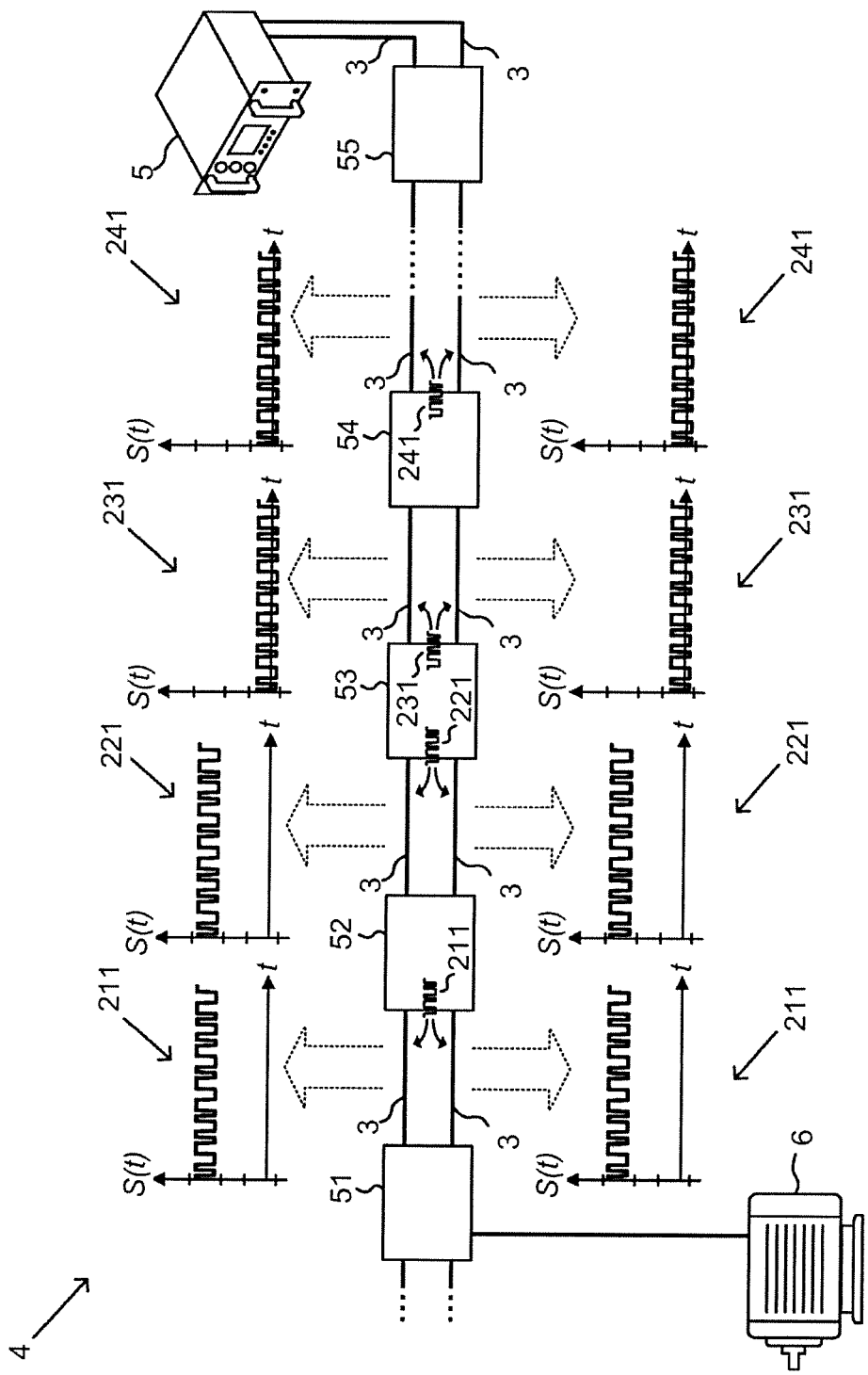
Figure 11:
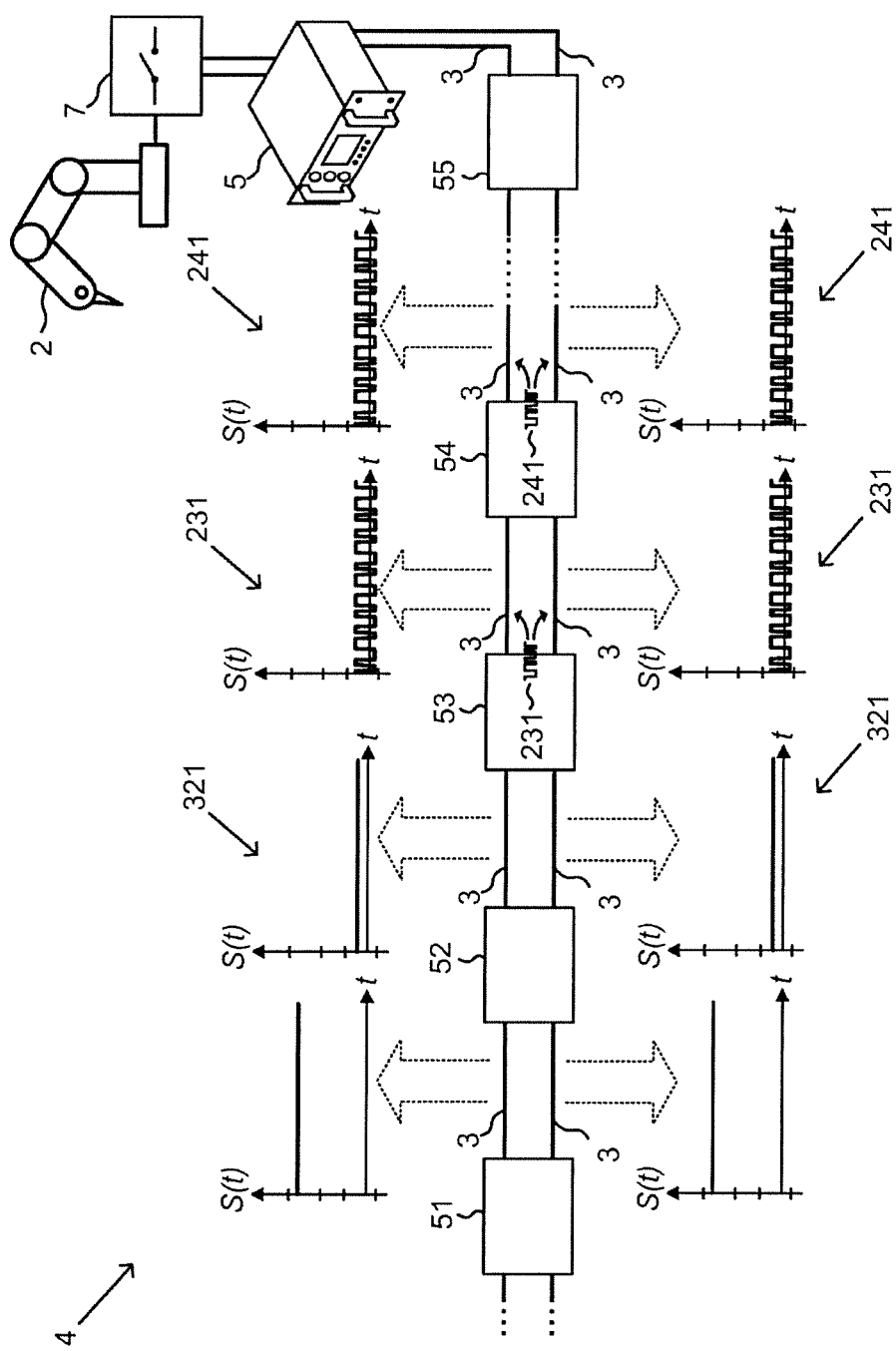
Figure 12:
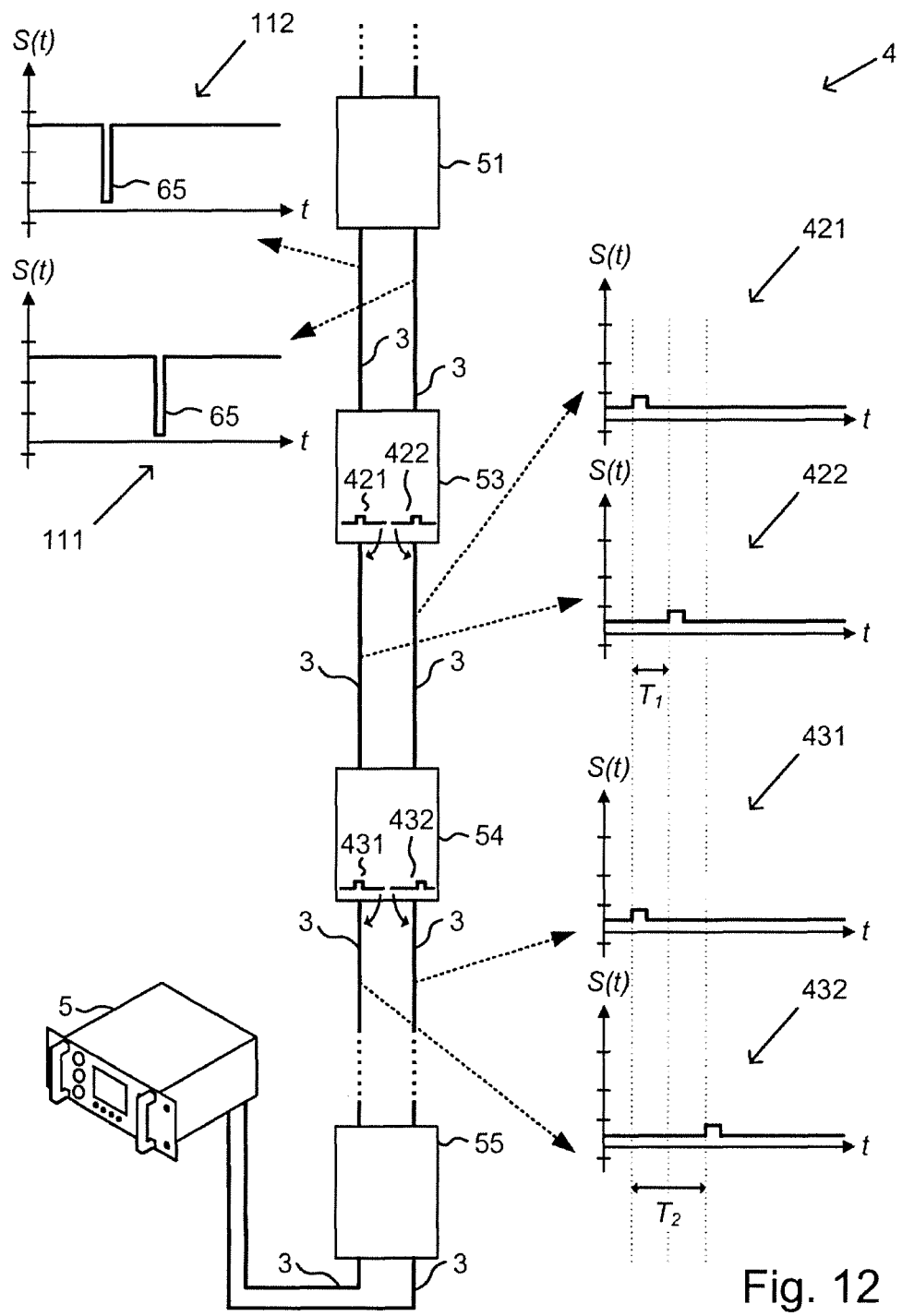

The invention is explained in detail below with reference to example embodiments with the attached drawings. Identical reference numbers are used for identical or corresponding elements or features. In the drawings:

FIG. 1: shows a schematic representation of the structure of a safety sensor according to the invention;

FIG. 2: shows two series-connected safety sensors according to the invention which monitor the operational safety of a system using external safety transmitters;

FIG. 3: shows the variation with time of a safety signal with a first and a second signal state;

FIG. 4: shows the variation with time of a safety signal with additional data impressed in the second signal state through baseband transmission using a Manchester code;

FIG. 5: shows the variation with time of a safety signal with additional data impressed in the second signal state using a frequency shift keying;

FIG. 6: shows the variation with time of a safety signal with additional data impressed in the second signal state through baseband transmission using a bipolar code;

FIG. 7: shows the variation with time of a safety signal with additional data impressed in the first and in the second signal state through baseband transmission using a Manchester code;

FIG. 8: shows a safety sensor chain with an evaluation unit and safety signals transmitted by the safety sensors;

FIG. 9: shows a safety sensor chain with an evaluation unit, safety signals transmitted by the safety sensors and additional data impressed on the output safety signals;

FIG. 10: shows a safety sensor chain with an evaluation unit, an actuator, safety signals transmitted by the safety sensors and additional data impressed on the input and output safety signals;

FIG. 11: shows a safety sensor chain with an evaluation unit, a switching device of a system, safety signals transmitted by the safety sensors and additional data impressed on the output safety signals;

FIG. 12: shows a safety sensor chain with an evaluation unit, safety signals transmitted by the safety sensors and additional data impressed on the output safety signals using an advantageous form of frequency shift keying.

FIG. 1 shows schematically the structure of a safety sensor 1 according to the invention. The safety sensor 1 has two safety signal inputs 11, 12 for receiving an input safety signal and two safety signal outputs 15, 16 for transmitting an output safety signal. The safety sensor 1 furthermore has a control unit 13 which is connected to the two safety signal inputs 11, 12 and the two safety signal outputs 15, 16.

The control unit 13 is configured to detect the operational state of a system to be monitored and to transmit an output safety signal at the two safety signal outputs 14, 15, the signal state of said output safety signal signaling the detected operational state. Depending on the detected operational state, the safety sensor 1 adopts an activated or deactivated sensor state. An activated sensor state is present if the control unit 13 has detected a safe operational state of the system. A deactivated sensor state is present if the control unit 13 has detected an unsafe operational state of the system. In addition, the control unit 13 is configured to impress additional data on a safety signal and decode additional data from a safety signal.

The safety sensor furthermore has an indicator unit 14 which is connected to the control unit 13 and is configured for the visual indication of the operational state of the system and additional data. The visual indication is provided in this example embodiment by LEDs similar to a traffic light in red, amber and green colors.

FIG. 2 shows two safety sensors 1a, 1b according to the invention which are connected in series for the signal transmission in that the first safety signal output 15 of the safety sensor 1a is connected to the first safety signal input 11 of the safety sensor 1b and the second safety signal output 16 of the first safety sensor 1a is connected to the second safety signal input 12 of the second safety sensor 1b in each case via a connection line 3. Further safety sensors 1, 1a, 1b, evaluation units, switching devices, actuators and/or other devices, indicated here by connection lines drawn as broken lines, can be connected to the safety signal outputs 15, 16 of the safety sensor 1b.

In this and in the following example embodiments, the signal transmission is performed redundantly via two parallel connection lines 3. This offers the advantage that the sensor state signaled via the safety signal outputs 15, 16, in particular a deactivated sensor state, can be reliably detected by a different safety sensor 1, 1a, 1b connected to the safety signal outputs 15, 16, by an evaluation unit, by a switching device and/or other device even if the signal transmission via one of the two parallel connection lines 3 is affected by interference.

Both safety sensors 1a, 1b in each case monitor the operational safety of a system 2. For this purpose, the safety sensors make use of the functionality of external safety transmitters 8, 9. The external safety transmitter 9 is a light grid which is positioned close to the system 2 in order to be able to detect, on the basis of an interruption of the light grid, whether a person or an object enters a safety area around the system 2 and therefore causes a risk. The light grid 9 is connected via two parallel connection lines 3 to the safety signal inputs 11, 12 of the safety sensor 1a. If the light grid is interrupted and a risk is therefore detected, the light grid transmits a safety signal which signals an unsafe operational state of the system via the connection lines 3 to the safety sensor 1a whose control unit 13 is thus enabled to detect the current operational state of the system 2.

In addition to the components of the safety sensor 1a which have already been described in connection with FIG. 1, the safety sensor 1b has a communication unit 31 which is connected to the control unit 13 of the safety sensor 1b and is configured to communicate with an external safety transmitter 32. The safety transmitter 32 is an actuator which is fitted to a protective door 8. The protective door 8 serves to prevent a hazardous and therefore forbidden entry of a person into a safety area around the system 2 during the operation of the system 2. An opening of the protective door 8 can be detected through the communication of the actuator 32 with the communication unit 31 of the safety sensor 1b and this information can be made available to the safety sensor 1b. In this way, the control unit 13 of the safety sensor 1b is enabled to detect the current operational state of the system 2.

Alternatively or additionally to the example embodiments of the safety sensors 1a and 1 b, the functionality of a safety transmitter can also be integrated into the safety sensor so that the safety sensor is able to detect the operational state of the system 2 without an external safety transmitter 9, 32.

If both the light grid 9 is uninterrupted and the protective door 8 is also closed, the control units 13 of both safety sensors 1a, 1b detect a safe operational state of the system 2. In this case, both safety sensors 1a, 1b have an activated sensor state and both control units 13 of the safety sensors 1a, 1b transmit a safety signal at the safety signal outputs 15, 16 of the respective safety sensor, said safety signal having the first signal state and therefore signaling a safe operational state of the system 2.

If a control unit 13 of at least one of the safety sensors 1a, 1b detects an unsafe operational state of the system 2, e.g. due to an interruption of the light grid 9 and/or due to an opening of the protective door 8, this safety sensor 1a, 1b adopts a deactivated sensor state and its control unit 13 transmits an output safety signal at its safety signal outputs 15, 16, said output safety signal having the second signal state therefore signaling an unsafe operational state of the system.

The control unit 13 can detect the operational state of the system 2 by means of an external safety transmitter 9, 32 and/or by means of a functionality, integrated into the safety sensor, of a safety transmitter. The control unit 13 can furthermore detect the operational state of the system 2 on the basis of the state of the input safety signal which is received the safety signal inputs 11, 12.

If the safety sensor 1b receives, for example, an input safety signal of the second signal state on one or both of its safety signal inputs 11, 12, the safety sensor 1b adopts a deactivated state and transmits an output safety signal at both safety signal outputs 15, 16 of the safety sensor 1b, said output safety signal similarly having the second signal state and therefore signaling an unsafe operational state of the system 2.

Conversely, if the safety sensor 1b receives an input safety signal at both safety signal inputs 11, 12, said input safety signal having the first signal state and therefore signaling a safe operational state of the system 2, and if a closed protective door 8 is additionally signaled by the actuator 32 to the communication unit 31 via the communication connection 33, the control unit 13 of the safety sensor 1b transmits an output safety signal at the safety signal outputs 15, 16 of the safety sensor 1b, said output safety signal similarly having the first signal state therefore signaling a safe operational state of the system 2.

In addition, the safety sensors 1a, 1b can indicate the respectively detected operational state of the system 2 by means of their indicator units 14, e.g. by means of a green LED in the case of a safe operational state and by means of a red LED in the case of an unsafe operational state.

FIG. 3 shows an example of a variation with time of a safety signal which can be transmitted and/or received by a safety sensor 1, 1a, over time t. A safety signal of this type may, for example, be an output safety signal which a safety sensor transmits at its at least one safety signal output.

In the example embodiment shown in FIG. 3, no additional data are impressed on the safety signal.

The safety signal has a signal value 25 which, in this and in the further example embodiments shown below, is the value of an electrical voltage which relates to a reference potential of 0 V. The representations of the safety signals in this and in the following example embodiments are not true to scale in respect of the voltage value, i.e. in terms of the signal value 25.

The signal value 25 may have two different signal states, i.e. a first signal state 21 or a second signal state 22. The first signal state 21 is represented by a signal value 25, i.e. an electrical voltage, from a first value range 23 assigned to the first signal state 21, whereas the second signal state 22 is represented by a signal value 25 from a second value range 24 assigned to the second signal state 22 and differing from the first value range 23.

The limits of the first value range 23 are formed by an upper threshold value 26 and a lower threshold value 27, whereas the limits of the second value range 24 are formed by an upper threshold value 28 and a lower threshold value 29. The lower threshold value 27 of the signal value 25 is formed by a voltage of +11 V, the upper threshold value 26 is formed by a voltage of +30 V, the lower threshold value 29 is formed by a voltage of −3 V and the upper threshold value 28 is formed by a voltage of +2 V.

In the variation with time, the safety signal initially shows the first signal state 21 which signals a safe operational state of the system. At time $t_1$, the safety sensor which transmits the safety signal shown by way of example in FIG. 3 detects an unsafe operational state of the system and therefore adopts a deactivated sensor state. After time $t_1$, the safety signal transmitted by the safety sensor therefore has the second signal state 22 which signals an unsafe operational state of the system.

FIG. 4 shows an example of the variation with time of a safety signal, as it can be transmitted and/or received according to the invention. In respect of the similarities with FIG. 3, reference is made to the descriptions relating to FIG. 3 for the avoidance of repetitions.

FIG. 4 also shows that, at time $t_1$, the safety sensor according to the invention which transmits the example shown of a safety signal detects an unsafe operational state of the system and adopts a deactivated sensor state. The safety signal transmitted by the safety sensor consequently changes to the second signal state 22 which signals an unsafe operational state of the system.

In the example embodiment shown in FIG. 4, the control unit of the safety sensor according to the invention begins at time $t_2$ to impress additional data on the transmitted output safety signal in that the signal value of the transmitted output safety signal is changed depending on the additional data. FIG. 4 shows an example embodiment in which additional data are impressed on the safety signal in the form of the bit sequence 01001101. This may involve, for example, control data and/or diagnostic data.

It is furthermore evident that the signal value of the transmitted output safety signal is changed within the limits 28, 29 of the value range 24 which is assigned to the presently transmitted second signal state 22. The additional data are impressed accordingly on the output safety signal of the second signal state 22 without the voltage value falling below the lower threshold value 29 of −3 V or exceeding the upper threshold value 28 of +2 V. As a result, an unsafe operational state of the system is signaled by the safety signal independently from the impressed additional data, so that a safety sensor or other device which receives the safety signal obtains uncorrupted information relating to the detected operational state of the system. The impression of the additional data therefore has no impact on the signal state which signals the detected operational state of the system.

In the example embodiment shown in FIG. 4, a baseband transmission is used to impress the additional data, wherein a Manchester code, which can be regarded as a special form of a phase shift keying and of a block code, is used for the line coding of the data.

The Manchester code used in the example embodiment shown provides that a binary 0 is encoded by a falling signal edge, i.e. by a change from a higher signal level to a lower signal level, and a binary 1 is encoded in a corresponding manner by a rising signal edge. The use of the Manchester code offers the advantage that at least one signal level change takes place per bit duration. A clock recovery from the received signal is thereby possible.

FIG. 5 shows a further example of a variation with time of a safety signal, as it can be transmitted and/or received by a safety sensor according to the invention. In respect of the similarities with FIGS. 3 and 4, reference is made to the descriptions relating to FIGS. 3 and 4 for the avoidance of repetitions.

In contrast to the example embodiment shown in FIG. 4, a frequency shift keying is used in the example embodiment shown in FIG. 5 to impress the additional data on the safety signal. A binary 0 is represented by a first frequency and a binary 1 by a second, higher frequency of the signal.

FIG. 6 shows a further example of a variation with time of a safety signal, as it can be transmitted and/or received by a safety sensor according to the invention. In respect of the similarities with FIGS. 3-5, reference is made to the descriptions relating to FIGS. 3-5 for the avoidance of repetitions.

In the example embodiment shown in FIG. 6, the bit sequence 1001101 is impressed by way of example on the safety signal, said bit sequence representing an example of additional data which may be control and/or diagnostic data. In contrast to the preceding example embodiments, a baseband transmission is used to impress the additional data, wherein the additional data are impressed in this example embodiment using a unipolar line code in which a binary 1 is encoded by a first signal level and a binary 0 by a second signal level, wherein the second signal level corresponds to the reference potential of 0 V.

FIG. 7 shows a further example of a variation with time of a safety signal, as it can be transmitted and/or received by a safety sensor according to the invention. In respect of the similarities with FIGS. 3-6, reference is made to the descriptions relating to FIGS. 3-6 for the avoidance of repetitions.

Whereas, in the preceding example embodiments shown in FIGS. 4-6, additional data have been impressed on the safety signal only if the safety signal has the second signal state 22, additional data are impressed in the example embodiment shown in FIG. 7 not only if the safety signal has the first signal state 21, but also if the safety signal has the second signal state 22. A baseband transmission is again used in conjunction with a Manchester code to impress additional data.

Up to time $t_1$, the safety signal has the first signal state 21. In order to impress the additional data, the signal value of the safety signal is therefore changed within the limits 26, 27 of the value range 23 assigned to the first signal state 21. Following the change of the signal state to the second signal state 22 at time $t_1$, the signal value of the safety signal is changed within the limits 28, 29 of the value range 24 assigned to the second signal state 22 in order to impress the additional data.

The example embodiment in FIG. 7 illustrates that additional data can be impressed on a transmitted output safety signal and/or a received input safety signal regardless of whether the presently transmitted or received safety signal has the first or the second signal state.

FIG. 8 shows an example embodiment of a safety sensor chain 4 with a plurality of safety sensors 51, 52, 53, 54, 55. Each of the safety sensors 51, 52, 53, 54, 55 has two safety signal inputs and two safety signal outputs. The two safety signal outputs of the safety sensor 51 are connected in each case for the signal transmission via a connection line 3 to the safety signal inputs of the safety sensor 52, the safety signal outputs of the safety sensor 52 are connected in a corresponding manner to the safety signal inputs of the safety sensor 53, etc. In this way, the safety sensors 51, 52, 52, 54, 55 are cascaded by means of a series circuit to form a safety sensor chain. As indicated in FIG. 8 by a broken line, the safety sensor chain may comprise further safety sensors on the side of the safety signal inputs of the safety sensor 51 and between the safety sensors 54 and 55. The safety signal outputs of the safety sensor 55 are connected via connection lines 32 to an evaluation unit 5. The evaluation unit 5 is configured for the evaluation of received safety signals and received additional data and for the visual and audible indication of the operational state of the system and the additional data.

The example embodiment shown in FIG. 8 furthermore shows that the safety sensors 51 and 52 have an activated sensor state, since they have in each case detected a safe operational state of the system. The safety sensor 51 consequently transmits an output safety signal 111 at its first safety signal output and an output safety signal 112 at its second safety signal output, said output safety signals in each case having the first signal state. These safety signals are received as input safety signals at the safety signal inputs of the safety sensor 52. The safety sensor 52 transmits output safety signals 121 and 122 at its safety signal outputs, said output safety signals similarly having the first signal state and therefore signaling a safe operational state of the system. These safety signals are received as input safety signals by the safety sensor 53.

In contrast to the safety sensors 51 and 52, the safety sensor 53 detects an unsafe operational state of the system which is caused, for example, by an opened protective door. The safety sensor 53 therefore adopts a deactivated sensor state and transmits a safety signal 131 in each case at its signal outputs, said safety signal having the second signal state, in order to signal the detected unsafe operational state of the system.

The safety signals 131 are received as input safety signals by the safety sensor 54. The safety sensor 54 detects an unsafe operational state of the system on the basis of the received input safety signal of the second signal state, similarly adopts a deactivated sensor state for this reason and transmits output safety signals 141 at its safety signal outputs, said output safety signals having the second signal state which signals an unsafe operational state of the system.

In this way, the deactivation of a safety sensor in the safety sensor chain 4, in the example embodiment shown the deactivation of the safety sensor 53, triggers the deactivation of all sensors in the safety sensor chain 4 which, on the side of the safety signal outputs of the deactivated safety sensor, are connected in series with the latter.

As a result, the information relating to the detected operational state of the system, which is, on the whole, an unsafe state in the example embodiment shown in FIG. 8, can be forwarded via the safety sensor chain 4 through to the safety sensor 55 and from the latter to the evaluation unit 5. The evaluation unit 5 can evaluate the received safety signals and on this basis, for example, can initiate measures which serve to avert risks arising from an unsafe operational state of the system.

FIG. 8 furthermore shows that the safety signals 111, 112, 121 and 122 contain test pulses 65. These test pulses 65 serve to detect a cross fault, short circuit, ground connection and/or ground fault and in this way guarantee the correct functionality of the safety sensors.

The safety sensors 51, 52, 53, 54, 55 do not impress any additional data on the safety signals in the example embodiment shown in FIG. 8. The evaluation unit 5 is therefore only able to detect that the safety sensor 55 has a deactivated state. The evaluation unit 5 is not, however, able to detect which safety sensor 51, 52, 53, 54, 55, in this example the safety sensor 53, originally detected the unsafe operational state of the system and therefore triggered the deactivation of the series-connected safety sensors. This considerably hinders the fault diagnosis and increases its complexity.

FIG. 9 shows a further example embodiment of a safety sensor chain 4, the structure of which is similar to that of the safety sensor chain shown previously in FIG. 8. In terms of the similarities, reference is made to the descriptions relating to FIG. 8 in order to avoid repetitions.

In the example embodiment shown in FIG. 9, the safety sensor 53 has again detected an unsafe operational state of the system to be monitored, therefore has a deactivated sensor state and transmits an output safety signal 231 in each case at its safety signal outputs, said output safety signal having the second signal state which signals an unsafe operational state of the system.

In addition, the safety sensor 53 impresses additional data on the transmitted output safety signal 231 in that the signal value of the safety signal is changed depending on the additional data within the limits of the value range assigned to the second signal state. These additional data comprise diagnostic data which relate to an identifier of the safety sensor, a position of the safety sensor, the operational state of the system detected by the safety sensor and/or the type and/or cause of the detected unsafe operational state, in the example given an opened protective door.

The safety signal 231 with the impressed additional data is received as an input safety signal by the safety sensor 241. The control unit of the safety sensor 54 decodes the impressed additional data from the input safety signal 231. In addition, the control unit of the safety sensor 54 forwards these additional data by impressing these additional data on the output safety signal 241 transmitted at its safety signal outputs, wherein the additional data can be impressed on the output safety signal 241 in unchanged or changed form. In this way, it is possible for the safety sensor 54 to add, for example, its own diagnostic data to the output safety signal 241. The safety signal and the additional data impressed on it are forwarded in a corresponding manner via the safety sensor 55 through to the evaluation unit 5.

The evaluation unit 5 evaluates both the received safety signal and the additional data impressed on it and indicates both the detected operational state of the system and the additional data. Using the diagnostic data obtained from the additional data, it is possible for the evaluation unit, for example, to detect that the safety sensor 53 originally detected the unsafe operational state of the system and is therefore responsible for the deactivation of the safety sensors connected to it in series on the output side. It thereby becomes immediately clear that, in the example given, the opening of the protective door monitored by the safety sensor 53 is the cause of the detected unsafe operational state of the system. The advantage according to the invention that the fault diagnosis is considerably simplified and sped up is thereby achieved.

FIG. 10 shows a further example embodiment of a safety sensor chain 4, the structure of which essentially corresponds to the structure of the safety sensor chains shown in FIGS. 8 and 9. In addition, the safety sensor 51 in the safety sensor chain shown in FIG. 10 is connected to an actuator 6 which may, for example, be a regulating motor. In terms of the similarities, reference is made to the descriptions relating to FIGS. 8 and 9 in order to avoid repetitions.

In the example embodiment shown in FIG. 10, the control unit of the safety sensor 53 furthermore impresses additional data on the input safety signals 221 received at the safety signal inputs of the safety sensor 53. The additional data are impressed in that the signal value of the received input safety signal is changed depending on the additional data within the limits of the value range which is assigned to the first signal state presently received in the example by the safety sensor 53. These additional data comprise control data which can be used for the parameterization and/or remote control of a safety sensor, an actuator, an evaluation unit and or other device.

From the perspective of the safety sensor 52, the safety signal outputs of which are connected to the safety signal inputs of the safety sensor 53, the additional data are thus impressed on the output safety signal 221 transmitted by the safety sensor 52. The control unit of the safety sensor 52 decodes these additional data from the output safety signal. The safety sensor 52 can then, for example, be remotely parameterized or remotely controlled using the control data contained in the additional data.

In addition, the control unit of the safety sensor 52 forwards the additional data via the safety signal inputs of the safety sensor 52 to the safety sensor 51. The control unit of the safety sensor 52 can forward the additional data in unchanged form, or it can forward the additional data in changed form and add, for example, further control data to the additional data.

The control unit of the safety sensor 51 in turn decodes the additional data from the output safety signal 211 present at its safety signal outputs. In this way, it is possible, for example, to remotely control the actuator 6. Thus, for example, if the actuator 6 performs the function of a regulating motor, suitable measures can be taken to transfer the system to a secured state and/or to initiate other measures to avert risks.

FIG. 11 shows a further example embodiment of a safety sensor chain 4, the structure of which is broadly similar to the structure of the safety sensor chains from the preceding example embodiments. In terms of the similarities, reference is made to the descriptions relating to FIGS. 8 and 9 in order to avoid repetitions.

In addition, the example embodiment in FIG. 11 shows a switching device 7 of the system 2 to be monitored which is connected to the evaluation unit 5. It is similarly possible according to the invention for the switching device 7 to be connected directly to one or more safety sensors. The switching device 7 of the system 2 is configured to deactivate the system 2 and/or to transfer the system 2 to a secured state and/or to initiate other measures to avert risks arising from an unsafe operational state of the system 2.

If at least one of the safety sensors 51, 52, 53, 54, 55 in the safety sensor chain 4 detects an unsafe operational state of the system and thereby triggers a deactivation of the safety sensors connected to it in series on the output side, the system 2 can advantageously be deactivated directly, for example, using the switching device 7 and a reactivation can be prevented until all sensors again adopt an activated sensor state, i.e. have detected a safe state of the system 2.

In the example embodiment shown in FIG. 11, the safety sensor 52 already detects an unsafe operational state of the system 2 and consequently adopts a deactivated sensor state. In this example embodiment, the safety sensor 52 may, for example, be a conventional safety sensor which is not configured to impress additional data on the safety signal. The safety sensor 52 therefore transmits at its safety signal outputs only an output safety signal 321 which has the second signal state and contains no impressed additional data.

The control unit of the safety sensor 53 thereby detects that an input safety signal of the second signal state is received at its safety signal inputs, that an unsafe operational state of the system 2 is present and that this unsafe operational state must have been detected by one of the safety sensors connected to the safety signal inputs of the safety sensor 53. On this basis, the control unit of the safety sensor 53 can generate diagnostic data and impress said diagnostic data as additional data on the output safety signals 231 transmitted at the safety signal outputs of the safety sensor 53.

In this way, for example, the position of the safety sensor 52 responsible for the detection of the unsafe operational state can advantageously be substantially localized and the diagnosis of the fault cause can be simplified accordingly if the safety sensor 52 responsible for the detection is a conventional safety sensor. A compatibility with conventional safety sensors is thus achieved according to the invention in that the safety sensor according to the invention can be deployed with extensive utilization of its functionality together with one or more conventional sensors within a safety sensor chain 4.

FIG. 12 shows a further example embodiment of a safety sensor chain 4 which comprises safety sensors 51, 52, 53, 54, 55 according to the invention which, in the manner previously described, have been cascaded via connection lines 3 through series connection to form a safety sensor chain.

The safety sensor 55 is also connected in this example via connection lines 3 to an evaluation unit 5. In terms of the similarities with the preceding example embodiment shown in Figure's 8 to 11, reference is made to the corresponding descriptions.

The safety sensor 51 shown in FIG. 12 has an activated sensor state. It transmits an output safety signal 111 at its first safety signal output and an output safety signal 112 at its second safety signal output, wherein both output safety signals have the first signal state which indicates a safe operational state of the system. The output safety signals 111, 112 additionally contain test pulses 65 for cross fault, short circuit, ground connection and/or ground fault detection.

In contrast to the safety sensor 51, the safety sensor 53 detects an unsafe operational state of the system, therefore adopts a deactivated sensor state and transmits safety signals 421, 422 at its safety signal outputs, said output safety signals in each case having the second signal state. As a result, the safety sensors 54 and 55 connected on the output side downstream of the safety sensor 53 similarly adopt a deactivated sensor state.

In addition, the safety sensor 53 impresses additional data comprising the diagnostic data on the output safety signal 421 transmitted at its first safety signal output and on the output safety signal 422 transmitted at its second safety signal output. As in the previously described example embodiments, these additional data are forwarded along the safety sensor chain via the safety sensors 54 and 55 through to the evaluation unit 5.

The special feature of the example embodiment shown in FIG. 12 is that the safety sensors use a special form of pulse phase modulation to impress the additional data on the safety signal. Diagnostic data, i.e. the position of the safety sensor 53 which originally detected the unsafe operational state of the system and triggered the deactivation of the remaining deactivated sensors 54, 55, are made available as additional data. For this purpose, the safety sensor 53 impresses a pulse on the transmitted output safety signal 421. The signal value of the safety signal is changed only within the limits of the value range assigned to the second signal state, i.e. the pulse is dimensioned in such a way that there is no departure from the electrical voltage value range from −3 V to +2 V assigned to the second signal state. In addition, the safety sensor 53 impresses a pulse of a similar type on the output safety signal 422, said pulse being temporally offset by a time interval $T_1$ in relation to the pulse of the safety signal 421.

The safety sensor 54 forwards the additional data in changed form in that its control unit impresses the additional data in changed form on the output safety signals 431, 432 transmitted at the safety signal outputs of the safety sensor 54. The time interval between the pulses impressed on the two safety signals and a specified value is increased, i.e. the pulse impressed on the output safety signal 432 is delayed by a specified time unit $T_x$ in addition to the time interval $T_1$ so that the time interval between the two pulses impressed on the output safety signals is then $T_2 = T_1 + T_x$. $T_2 > T_1$ then applies. In one advantageous embodiment, $T_x = T_1$ can be selected for this purpose, so that $T_2 = 2 \cdot T_1$ applies.

In this way, the additional data impressed on the safety signal can be forwarded along the safety sensor chain, wherein each of the downstream sensors similarly adds a specified time delay to the pulses. The time interval between the pulses thus encodes a counter reading which indicates the relative position of the safety sensor which originally detected the unsafe operational state of the system to be monitored, counted from the evaluation unit 5. The evaluation unit 5 can therefore evaluate the additional data impressed on the safety signals simply by determining the time interval between the pulses and by identifying the position of the relevant safety sensor 53 therefrom. The diagnosis of the cause of the detection of the unsafe operational state of the system is thus considerably simplified and sped up.

Along with fields of application of manufacturing and assembly technology to be cited by way of example, a use of the safety sensor according to the invention and/or a safety sensor chain formed from safety sensors according to the invention offers substantial advantages in elevator technology. Here, the shaft doors can be monitored by means of safety sensors according to the invention, wherein each opened or not correctly closed shaft door triggers an immediate deactivation of the travelling function of the elevator.

If it is not known which safety sensor triggered the deactivation of the sensor state, maintenance personnel must check the door states on each floor. This manual diagnosis may take a substantial amount of time depending on the number of floors and may confine the persons in the elevator cabin for an unwanted length of time, as a result of which further risks may arise.

Through the use of the safety sensors according to the invention, a time-consuming manual diagnosis of this type is not necessary, since the series-connected, cascaded safety sensors signal the position of the safety sensor responsible for the deactivation, i.e. the safety sensor which originally detected the opened or not correctly closed shaft door, using the additional data (diagnostic data) which are impressed on the safety signal. This enables maintenance personnel to clear the fault promptly on the floor concerned.

The invention claimed is:

1. A safety sensor for monitoring operational safety of a system, comprising:
   a) at least one safety signal input for receiving an input safety signal which can have a first signal state or a second signal state,
   b) at least one safety signal output for transmitting an output safety signal which can have the first signal state or the second signal state, and
   c) a control unit which is connected to the at least one safety signal input and to the at least one safety signal output and which is configured to detect an operational state of the system which may be a safe or an unsafe operational state and to transmit an output safety signal whose signal state signals the detected operational state on the at least one safety signal output,
      wherein the first signal state signals a safe operational state of the system and is represented by a signal value from a first value range assigned to the first signal state, and the second signal state signals an unsafe operational state of the system and is represented by a signal value from a second value range which is assigned to the second signal state and which differs from the first value range, and
      wherein the control unit is configured to impress additional data on the transmitted output safety signal such that the signal value of the transmitted output safety signal is changed within limits of the value range which is assigned to the transmitted signal state of the output safety signal depending on the additional data, and/or wherein the control unit is configured to impress additional data on the received input safety signal such that the signal value of the received input safety signal is changed within limits of the value range which is assigned to the received signal state of the input safety signal depending on the additional data.

2. The safety sensor as claimed in claim 1, wherein the at least one safety signal output is connectable to at least one safety signal input of a different safety sensor for the signal transmission, and/or the at least one safety signal input is connectable to at least one safety signal output of a different safety sensor for the signal transmission, wherein connections to one more of the different safety sensor(s) cascade a plurality of safety sensors as a series circuit to form a safety sensor chain.

3. The safety sensor as claimed in claim 1, wherein the control unit is configured to decode the additional data impressed on the input safety signal from the input safety signal and/or to decode the additional data impressed on the output safety signal from the output safety signal.

4. The safety sensor as claimed in claim 1, wherein the additional data comprise diagnostic data which relate to one or more of an identifier of the safety sensor, a position of the safety sensor, the operational state of the system detected by the safety sensor, and a type and/or cause of a detected unsafe operational state and/or other diagnostic information.

5. The safety sensor as claimed in claim 1, wherein the additional data comprise control data which are used for parameterization and/or remote control of a safety sensor, an actuator, an evaluation unit and/or other device connected to the safety sensor.

6. The safety sensor as claimed in claim 1, wherein the control unit is configured to forward additional data, wherein the control unit impresses additional data impressed on the input safety signal in unchanged form or changed form on the output safety signal and/or impresses additional data impressed on the output safety signal in unchanged or changed form on the input safety signal.

7. The safety sensor as claimed in claim 1, wherein the control unit is configured to generate diagnostic data depending on the received input safety signal and/or depending on the operational state of the system detected by the control unit and to impress the diagnostic data on the output safety signal as additional data.

8. The safety sensor as claimed in claim 1, wherein the control unit is configured to impress additional data on the transmitted output safety signal only if the output safety signal has the second signal state and/or to impress additional data on the received input safety signal only if the input safety signal has the second signal state.

9. The safety sensor as claimed in claim 1, wherein the safety sensor has an indicator which is configured for visual and/or audible indication of the operational state of the system and/or the additional data.

10. The safety sensor as claimed in claim 1, wherein the at least one safety signal output is connectable to a switching device which is configured to deactivate the system and/or transfer the system to a secured state and/or instigate measures to avert risks arising from an unsafe operational state of the system.

11. The safety sensor as claimed in claim 1, wherein the at least one safety signal output is connectable to an evaluation unit which is configured to evaluate received safety signals and/or received additional data and/or is configured for the visual and/or audible indication of the operational state of the system and/or the additional data.

12. The safety sensor as claimed in claim 1, wherein the signal value is an electrical voltage value related to a reference potential.

13. The safety sensor as claimed in claim 12, wherein either the first or the second value range comprises the reference potential.

14. The safety sensor as claimed in claim 12, wherein the signal value in the form of an electrical voltage is changed within a value range from +11 V to +30 V for the first signal state and within a value range from −3 V to +2 V for the second signal state.

15. The safety sensor as claimed in claim 1, wherein the control unit is configured to impress additional data on the transmitted output safety signal and/or on the received input safety signal using a unipolar or bipolar line code, an AMI code, a block code, a Manchester code, an amplitude shift keying, a frequency shift keying, a phase shift keying, a quadrature amplitude modulation, a pulse amplitude modulation, a pulse phase modulation, a pulse frequency modulation and/or a pulse width modulation.

16. The safety sensor of claim 13, wherein the reference potential is 0 V.

* * * * *